US006945593B2

United States Patent
Andre et al.

(12) United States Patent  
(10) Patent No.: US 6,945,593 B2  
(45) Date of Patent: Sep. 20, 2005

(54) END PART FOR A VEHICLE ENGINE HOOD

(75) Inventors: Gerald Andre, Amberieu en Bugey (FR); Pascal Banry, Bourg Saint Christophe (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/669,793

(22) Filed: Sep. 25, 2003

(65) Prior Publication Data

US 2004/0130186 A1 Jul. 8, 2004

(30) Foreign Application Priority Data

Sep. 27, 2002 (FR) .............................................. 02 12019

(51) Int. Cl.[7] .............................................. B62D 25/12
(52) U.S. Cl. .............................. 296/187.09; 296/193.1; 296/193.11; 293/117
(58) Field of Search ....................... 296/187.04, 187.09, 296/193.09, 193.1, 193.11; 295/115, 117; 180/89.17

(56) References Cited

U.S. PATENT DOCUMENTS

| 3,850,474 | A | | 11/1974 | Welch | |
| 5,478,127 | A | * | 12/1995 | Chase | 293/115 |
| 6,739,634 | B1 | * | 5/2004 | Pagan | 293/117 |

FOREIGN PATENT DOCUMENTS

GB      1 570 272      6/1980

* cited by examiner

*Primary Examiner*—Jason Morrow  
(74) *Attorney, Agent, or Firm*—Oliff & Berridge, PLC

(57) ABSTRACT

A front end part for the engine hood of a vehicle that can accommodate small deformations that result from impacts at low speed or other kinds of thrusts without there being any damage to the hood. The part being made of a deformable plastics material and including a strength member for fixing it to an engine hood so as to extend the hood towards the front of the vehicle. The vehicle front face can also include such an end part in addition to a hood and a bumper.

9 Claims, 5 Drawing Sheets

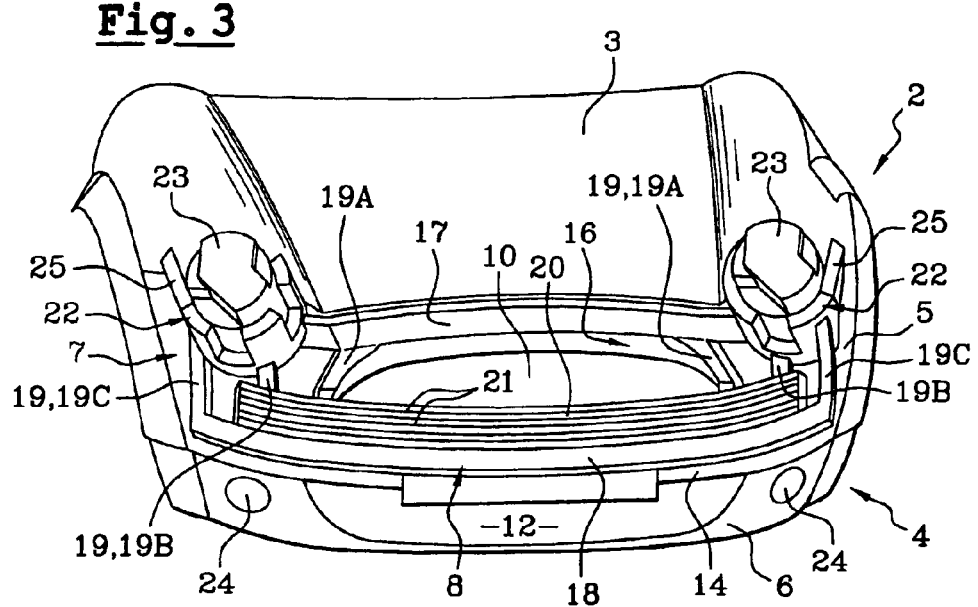
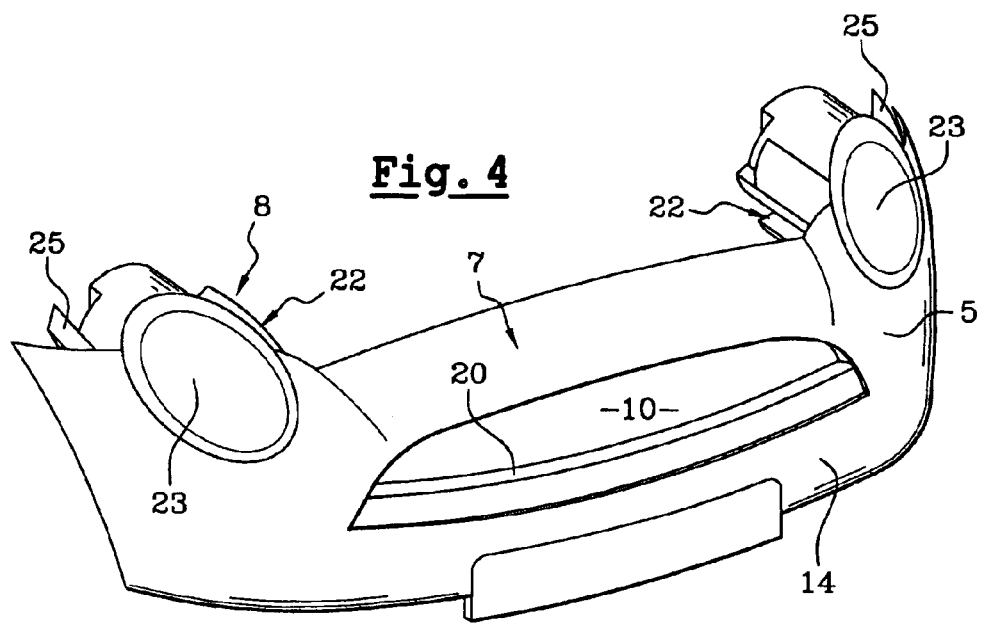

END PART FOR A VEHICLE ENGINE HOOD

The present invention relates to a front end part for an engine hood, and also to a front face of a vehicle including such a front end part.

BACKGROUND OF THE INVENTION

Engine hoods need to be quite strong since they are generally handled without taking precautions. That is why they are often made out of sheet metal, even though some hoods have recently appeared on the market that are made out of high strength thermoplastics.

This strength presents at least two drawbacks.

Firstly, in the event of a pedestrian coming into collision with the front of the vehicle, the strong hood runs the risk of striking the pedestrian directly.

Secondly, even in an impact at low speed, commonly referred to as "insurance knocks", this type of strong hood is easily damaged. It then needs to be replaced, and even for impacts that are not serious, this requires the vehicle to be out of operation for quite a long time and involves substantial repair costs.

This problem becomes particularly severe when the hood is a plunging hood covering not only the top of the engine compartment, but also extending down over the front of the vehicle to the bumper shield, as is commonly the case for sports cars.

Furthermore, under such circumstances, the join between the hood and the shield does not touch accurately, since vertical clearance must be left between these two parts in order to enable the hood to be slammed shut.

To make this clearance acceptable in appearance, use is made of the trick whereby the adjacent edges of the hood and the shield are offset so that they do not lie one above the other, even though they remain in the same horizontal plane.

As a result, the join between the hood and the shield appears to be touching when the vehicle is seen from in front. However, when seen from the side the offset is clearly visible, but that is considered to be less unpleasing in appearance.

OBJECTS AND SUMMARY OF THE INVENTION

The present invention seeks to remedy the above-mentioned drawback of known hoods, in particular a plunging hood that comes down over the front to meet the bumper shield.

Thus, the invention provides a front end part for a vehicle engine hood, the end part being made of a deformable plastics material and including means for fixing it to an engine hood so as to extend the hood towards the front of the vehicle.

The invention also provides a vehicle front face which includes such an end part in addition to a hood and a bumper.

Such an end part can accommodate the small deformations that result from impacts at low speed or from the kind of thrust that arises making parking maneuvers, without there being any damage to the hood.

If deformed within its elastic limit, the end part returns to its initial shape and no repair is needed. If deformed more than that, and providing the hood itself remains intact, only the end part needs to be replaced, which is much less expensive than replacing an engine hood.

The invention thus makes it possible to provide a plunging hood that comes down over the front of a vehicle without presenting the fragility of ordinary hoods.

In a preferred embodiment, the end part forms at least a portion of the vehicle shield.

Such a disposition is particularly advantageous since it suffices to lift the hood in order to have full access not only to the engine unit, but also to the equipment front face of the vehicle, thus making repairs much easier when they are required.

The bumper may include a low portion referred to as a "spoiler" situated beneath the shield and secured to the main structure of the vehicle, e.g. a transverse beam, so that in the event of an impact against a leg, the leg is prevented from being deflected through an angle that is likely to damage the knee joint.

Slamming clearance can then be provided which does not spoil the appearance of the front of the vehicle. It suffices to transfer the slamming clearance to the junction between the shield and the spoiler.

This junction is less exposed to view since it is lower down than the boundary between the hood and the shield, and since it is generally set back from the front of the shield.

It should be observed that the low portion of the bumper, when there is one, needs to be securely fixed to the main structure of the vehicle so as to be in a position to handle impacts against legs.

In a particular embodiment, the end part includes an air intake forming at least a portion of a radiator grille.

By way of example, this grille may include horizontal slats. Where appropriate, another portion of the grille is made in the spoiler. It is then possible to form the slamming clearance between two horizontal slats of the air inlet grille.

In a particular embodiment, the end part includes a strength member forming means enabling it to be fixed to the hood.

Furthermore, the end part may include at least some of the light units at the front of the vehicle.

This enables new shapes to be provided for front faces, whereas in the past vehicle light units have generally been situated at the junction between the hood and the shield. This also makes it easier to change bulbs, since opening the hood gives access directly to the light units.

By way of example, the light units may be supported by the above-mentioned strength member, thereby further increasing the strength with which they are fixed. The strength member may also include an impact beam so as to absorb at least a fraction of the energy of an impact to which the vehicle is subjected.

BRIEF DESCRIPTION OF THE DRAWINGS

The invention will be better understood on reading the following description given purely by way of example and made with reference to the accompanying drawings, in which:

FIG. 3 is a rear view in perspective of the front face of FIG. 2, in which figure there can be seen the strength member for fixing the end part to the engine hood;

FIG. 4 is a fragmentary front view in perspective of the FIG. 1 front face showing the end part, the strength member, and the headlight units;

MORE DETAILED DESCRIPTION

Figure 1:
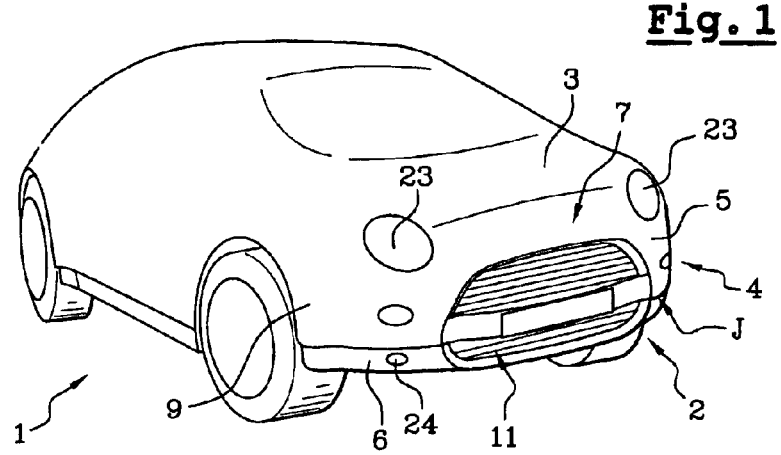
FIG. 1 is a perspective view of a motor vehicle fitted with a hood extended by an end part, together with a spoiler disposed beneath the end part.
Figure 9:
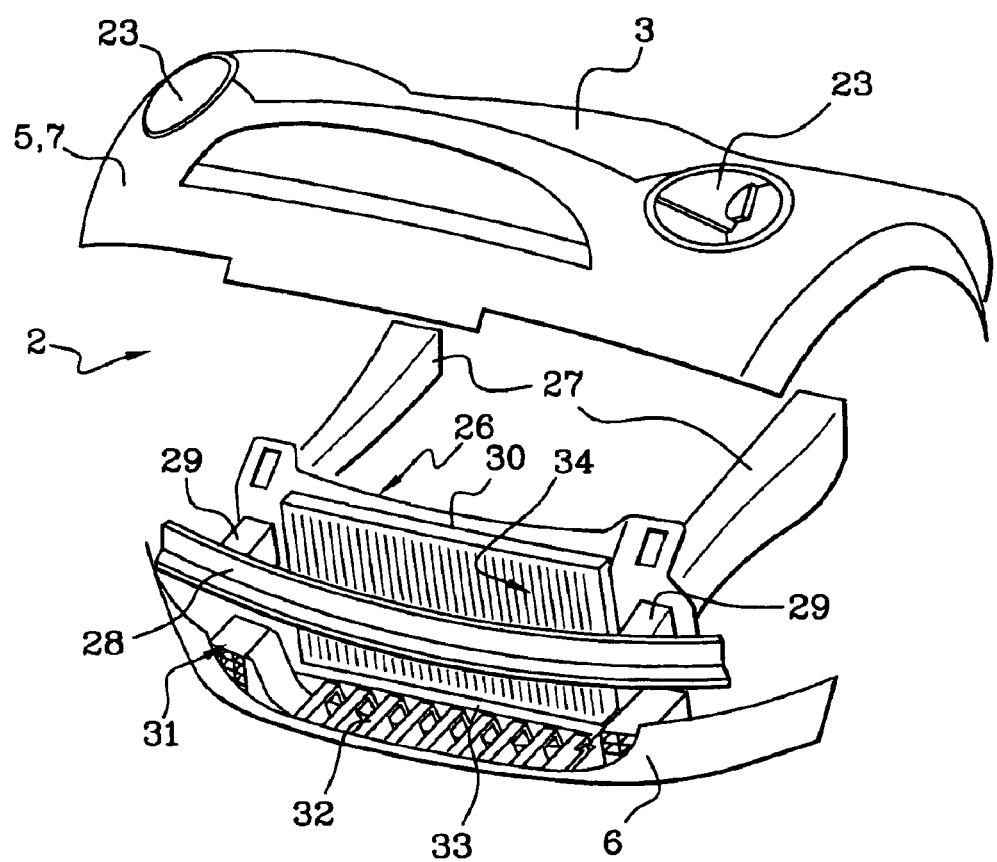
FIG. 9 is a perspective view from another viewing angle showing the front face of FIG. 2 with the hood shown in the open position.

FIG. 1 shows a motor vehicle 1 presenting a front face 2 which includes an engine hood 3 hinged between a closed position in which it covers the engine and prevents access thereto (as shown in FIG. 1) and an open position in which it allows access (as shown in FIG. 9).

The engine hood 3 is a rigid part since it contributes to providing the general strength of the vehicle 1. In order to present such structural strength, it is preferably made of metal, generally of steel sheet, although certain rigid plastics materials can be suitable.

The front face 2 also has a front bumper 4 designed in particular to absorb at least a fraction of the energy in the event of the vehicle 1 being subjected to a front or a side impact.

The bumper 4 has a top portion 5, also referred to as a "shield", made of a thermoplastic such as polypropylene and a bottom portion 6, also referred to as a "spoiler", which, being situated beneath the shield 5, is mounted on the main structure of the vehicle 1 both to improve its aerodynamics at high speed and to contribute to damping any impact to which a pedestrian might be subjected by preventing the pedestrian's leg being deflected through an angle that could lead to lesions in the knee. More precisely, the position of the spoiler 6 is designed, in the event of an impact, to prevent the angle that is formed between the thigh and the tibia exceeding a value of about 15°. The spoiler 6 is, for example, fixed to a low transverse beam for handling such impacts.

As can be seen in particular in FIGS. 1 and 2, the front face 2 of the vehicle 1 also has an end part 7 fixed to the hood 3 and extending it towards the front of the vehicle 1, with fixing being provided by fixing means 8 that are described below.

This end part 7 is made of a deformable plastics material so that by deforming it absorbs at least a fraction of the energy of an impact to which the vehicle 1 is subjected. As a result, at low speed, this part 7 absorbs all of the energy that would otherwise be absorbed by the engine hood.

The hood 3 is thus protected from the damage that it normally suffers and all that needs replacing is the end part 7—assuming that it is actually damaged—without it being necessary to take action on the hood 3.

The end part 7 preferably forms at least a portion of the shield 5 of the vehicle. In this example, as shown in the figures and in particular in FIG. 2, the end part 7 in fact forms the entire shield 5.

Thus, when the hood 3 is in the closed position, the end part 7 covers the equipment front face 26 of the vehicle 1, and in particular its functional members such as a radiator 34, which frequently needs to be repaired after an impact.

In contrast, when the hood 3 is in the open position, the end part 7, which travels with the hood 3 during opening, allows free access to the equipment front face 26 of the vehicle 1, thus making most of the actions that need to be taken to the equipment front face 26 easier, and in particular replacement of the radiator 34, where such replacement is commonly a relatively lengthy operation requiring the bumper to be removed.

There is no need to provide clearance between the hood 3 and the end part 7, since the two parts are connected together. However, a slamming clearance J is needed between the end part 7 and the spoiler 6 so as to enable the hood 3 to be closed without damaging parts that are secured to the main structure of the vehicle 1.

Since the junction between the shield 5 and the spoiler 6 is situated relatively low down, this slamming clearance J is almost invisible, or indeed completely hidden from sight, thereby improving the appearance of the vehicle and increasing its perceived quality.

Figure 8:
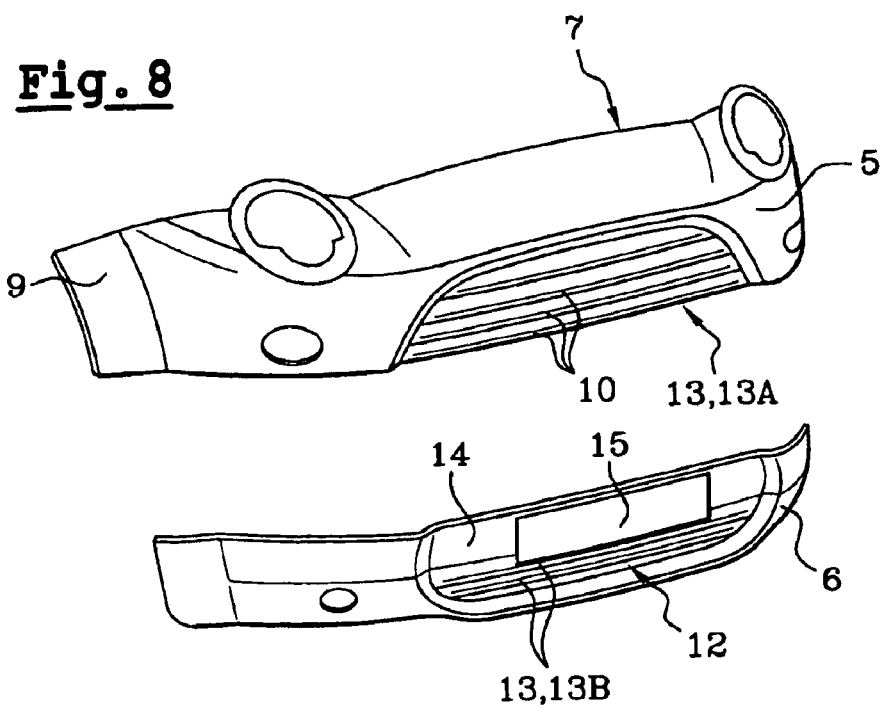
FIG. 8 is an exploded front perspective view showing the vehicle end part of FIG. 1, together with the spoiler disposed beneath the end part.

Furthermore, in the embodiment shown in FIGS. 1 and 8, the end part 7 even forms a fraction of the fender extensions 9, further improving the continuity of the bodywork.

In an embodiment, the end part 7 includes an air intake 10 serving in particular to cool the engine unit. This air intake 10 forms at least a portion of a radiator grille 11. More precisely, and as can be seen in the figures, the radiator grille 11 is constituted by two air intakes, i.e. a top air intake 10 formed in the end part 7 as described above, and a bottom air intake 12 formed in the spoiler 6.

As can be seen in FIGS. 1 and 8, the radiator grille 11 comprises a series of parallel horizontal slats 13 suitable for guiding the flow of air entering under the hood 3. Some of the slats 13A extend across the top air intake 10, while the remaining slats 13B extend across the bottom air intake 12. It is thus possible to use the radiator grille 11 to hide the slamming clearance J between the bottom slat of the top air intake 10 and the top slat of the bottom air intake 12.

In the embodiment shown in the figures, the top and bottom air intakes 10 and 12 are in fact separated by a horizontal strip 14 serving in particular to support a number plate 15.

Figure 2:
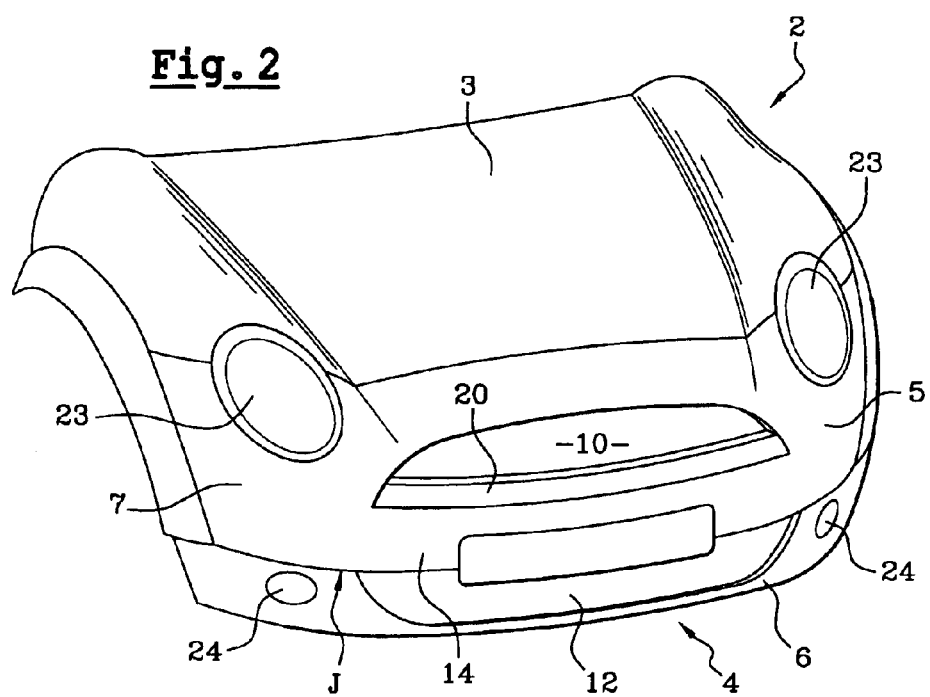
FIG. 2 is a front view in perspective showing a vehicle front face, and in particular the engine hood, the end part, the spoiler, the fenders, and the vehicle headlight units.
Figure 5:
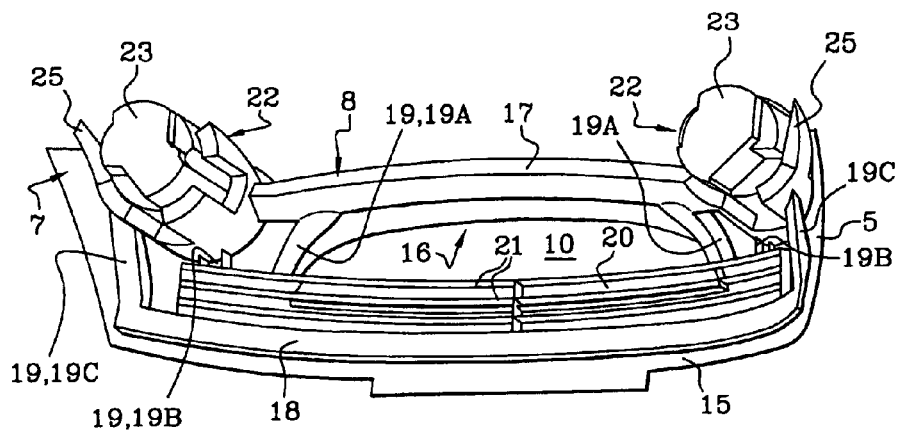
FIG. 5 is a rear view in perspective of the assembly shown in FIG. 4.
Figure 6:
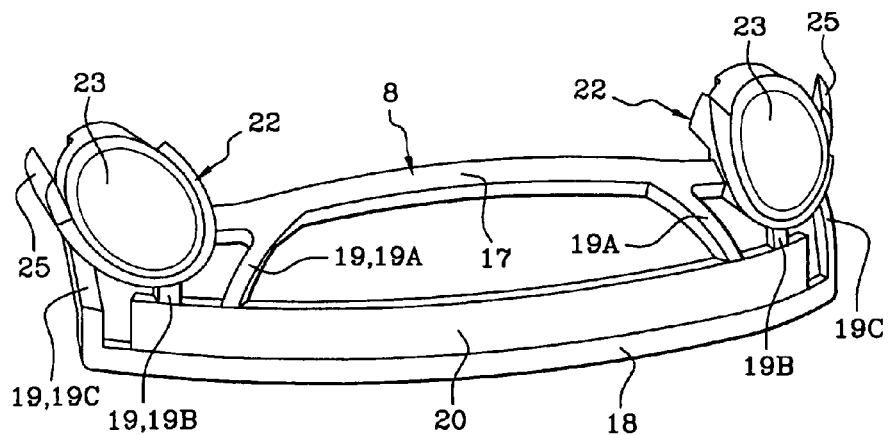
FIG. 6 is a fragmentary front view in perspective showing the strength member that is visible in FIG. 3, with the headlight units mounted thereon.
Figure 7:
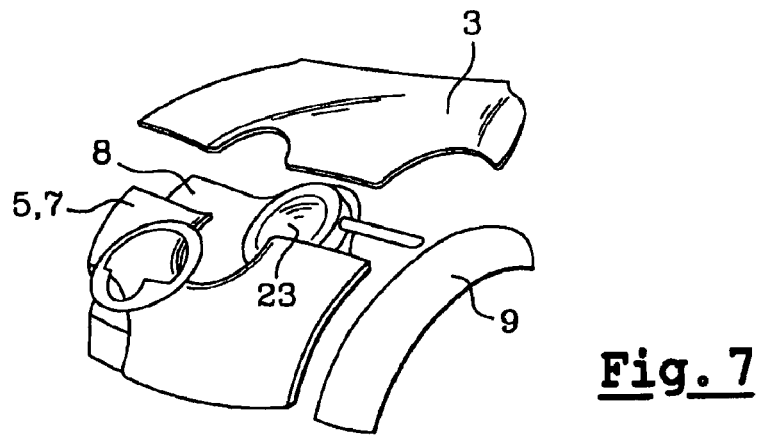
FIG. 7 is an exploded fragmentary perspective view seen from beside the front left fender of the FIG. 1 vehicle.

In the embodiment shown in FIGS. 1 and 8, this strip 14 is formed on the spoiler 6, whereas in the embodiment shown in FIG. 2, this strip is formed on the end part 7, thus increasing the strength thereof.

In order to control the incoming air flow, it is possible to provide means for controlling the angle of the slats 13, for example using one or more electric motors under manual or electronic control.

Returning to the fixing means 8, these are in the form of a strength member which may be made of metal but in this case is made of a plastics material (such as polypropylene) which presents the particular advantage of being lightweight.

The strength member 8 is preferably tubular in structure for the purpose of strengthening it. For this purpose, the strength member 8 can be made using the technique of injection molding a plastic material with gas assistance, commonly referred to as "gas molding".

The strength member 8 is fixed on a rear face 16 of the end part 7 and it extends over substantially the entire width thereof (see FIG. 3).

The strength member 8 comprises a top cross-member 17 and a bottom cross-member 18 that are substantially parallel and that extend horizontally on either side of the top air intake 10. In the embodiment shown in FIG. 3, where the end part 7 has a horizontal strip 14 as described above, the top cross-member 18 extends behind the strip 14 so as to stiffen the end part 7 in this zone.

At the lateral ends of the strength member 8, the cross-members 17, 18 are interconnected by substantially vertical uprights 19 which extend laterally on either side of the top air intake 10. As can be seen in FIG. 3, three uprights 19 are provided at each lateral end of the strength member 8, i.e. an inner upright 19A, an outer upright 19C, and an intermediate upright 19B between the other two.

Although the main functions of the strength member 8 are to stiffen the end part 7 and to fix it to the hood 3, the strength member 8 may also contribute to absorbing impacts, at least at low speed.

Thus, in the embodiment shown in FIGS. 2 to 6, the strength member has an impact absorber 20 which extends over and along the bottom cross-member 18 and matches its curvature.

In order to absorb impacts effectively, the impact absorber 20 extends over a substantial height behind the end part 7. The impact absorber 20 even extends a little into the top air intake 10, as can be seen in FIGS. 1 and 4. This impact absorber 20 is made, for example, out of a plastics material such as a polypropylene foam, and in this case it is reinforced by ribs 21.

The strength member also has two receptacles 22, each serving to house at least one of the front light units 23 of the vehicle 1. In this case the unit comprises a main headlight 23, with additional lights 24 such as a fog light being integrated in the spoiler 6, as can be seen in FIGS. 2 and 3.

The receptacles 22 which in this case are formed at the junction between the top cross-member 17 and the intermediate and outer uprights 19B and 19C is extended rearwards and upwards by tabs 25 for fixing the strength 8 to the hood 3. This fixing may be performed by any appropriate means such as adhesive, screw fastening, rivets, or indeed snap-fastening.

The strength member 8 thus forms a support for the headlights 23 which are thus integrated in the end part 7. The headlights 23 thus accompany the hood 3 when it opens, thus making access to the headlights 23 easier, particularly for routine actions such as replacing a bulb.

In the embodiment shown in the figures, the headlights 23 are situated at the junction between the hood 3 and the end part 7, essentially for reasons of style. Nevertheless, for the same reasons, the headlights 23 could equally well extend completely in the end part 7 without extending beyond it.

Furthermore, provision can be made for mounting the end part 7 on the strength member 8 with one or more degrees of freedom, in particular for the purpose of adjusting the position of the end part 7 relative to the other bodywork elements, and more particularly relative to the engine hood 3.

Thus, the end part 7 may be pierced by oblong holes extending vertically, and receiving fixing screws or pegs of the strength member 8 so as to enable the vertical position of the end part 7 to be adjusted relative to the hood 3, in particular for the purpose of minimizing the visible join between these two parts.

The hood 3 is shown in the open position in FIG. 9, where the equipment front face 26 of the vehicle 1 can be seen, which front face is carried by the chassis 27 of the vehicle.

An impact beam 28 extends transversely a certain distance in front of the equipment front face 26 and it is fixed thereto by local impact absorbers 29 disposed on either side of the housing 30 in which the radiator 34 is placed.

The impact beam 28 is situated at a height such that when the hood 3 is in its closed position (FIG. 2), the beam lies behind the shield 5, in particular in order to deal with impacts at low speed.

As shown in FIG. 9, the spoiler 6 is also carried by the equipment front face 26 to which it is fixed by means of a support 31 including deformable means 32 for absorbing at least a fraction of the energy of an impact to which the vehicle 1 is subjected at the height of the spoiler 6. These deformable means, provided in the present example in the form of blocks of foam, are essentially provided for dealing with leg impacts so that in the event of an impact against a pedestrian, the pedestrian's leg does not pass under the vehicle 1.

The spoiler 6 is far enough away from the equipment front face 26 to leave an empty space 33 in front of the radiator 34, which space may receive various functional members of the vehicle, in particular electrical connection cables which are usually placed behind the shield.

As will have been understood, the equipment front face 24 is structurally separate from the shield 5. This makes it possible to standardize the equipment front face 24 which conventionally differs from one vehicle to another.

Furthermore, the fact of the light units being carried by the end part 7 instead of being integrated in the equipment front face as is usual, means that the equipment front face can be simplified since it is dissociated from the light units.

What is claimed is:

1. A front end part of an engine hood of a vehicle that includes front light units, the front end part being made of a deformable plastics material, comprising:

means for fixing said front end part to the engine hood so as to extend the engine hood towards the front of the vehicle, in such a manner that said front end part accompanies the engine hood when it is opened, at least a portion of front light units of the vehicle being integrated into the front end part.

2. A front end part according to claim 1, wherein the front end part forms at least a part of a shield of the vehicle.

3. A front end part according to claim 1, wherein the front end part includes a strength member forming the means for fixing the front end part to the hood.

4. A front end part of an engine hood of a vehicle, the front end part being made of a deformable plastics material, comprising:

means for fixing the front end part to the engine hood so as to extend the engine hood towards the front of the vehicle, in such a manner that the front end part accompanies the engine hood when it is opened, and integrating at least a portion of front light units of the vehicle, wherein the front end part includes a strength member forming the means for fixing the front end part to the hood, and wherein the strength member forms a support for at least a portion of the front light units of the vehicle.

5. A front end part of an engine hood of a vehicle, the front end part being made of a deformable plastics material, comprising:

means for fixing the front end part to the engine hood so as to extend the engine hood towards the front of the vehicle, in such a manner that the front end part accompanies the engine hood when it is opened, and integrating at least a portion of front light units of the vehicle, and wherein the front end part includes a strength member forming the means for fixing the front end part to the hood, and wherein the strength member includes an impact absorber.

6. A front end part according to claim 1, wherein the front end part includes an air intake forming at least a portion of a radiator grille.

7. A motor vehicle front face including a hood, a bumper, and a front end part according to claim 1.

8. A front face according to claim 7, wherein said front end part forms at least a portion of a shield of the bumper.

9. A front face according to claim 8, wherein the bumper includes a spoiler disposed beneath the front end part, and in that slamming clearance is provided between the end part and the spoiler.

* * * * *